United States Patent [19]

Wilkie

[11] Patent Number: 5,083,261
[45] Date of Patent: Jan. 21, 1992

[54] DYNAMICALLY ALTERABLE INTERRUPT PRIORITY CIRCUIT

[75] Inventor: Brian F. Wilkie, Austin, Tex.

[73] Assignee: Motorola, Inc., Schaumburg, Ill.

[21] Appl. No.: 548,527

[22] Filed: Nov. 3, 1983

[51] Int. Cl.$^5$ .............................................. G06I 13/26
[52] U.S. Cl. ................... 395/725; 364/242.6; 364/241.8; 364/261.2; 364/DIG. 1
[58] Field of Search ... 364/200 MS File, 900 MS File

[56] References Cited

U.S. PATENT DOCUMENTS

| | | | |
|---|---|---|---|
| 3,925,766 | 12/1975 | Bardotti | 364/200 |
| 4,001,784 | 1/1977 | Bardotti | 364/200 |
| 4,020,471 | 4/1977 | Woods et al. | 364/200 |
| 4,035,780 | 7/1977 | Kristick | 364/900 |
| 4,296,463 | 10/1981 | Dalboussiere et al. | 364/200 |
| 4,313,160 | 1/1982 | Kaufman | 364/200 |
| 4,326,249 | 4/1982 | Godsey | 364/200 |
| 4,338,662 | 7/1982 | Yokoyama | 364/200 |
| 4,470,111 | 9/1984 | Jenkins | 364/200 |
| 4,499,538 | 2/1985 | Finger et al. | 364/200 |
| 4,523,277 | 6/1985 | Schnathorst | 364/200 |
| 4,727,477 | 2/1988 | Gavril | 364/200 |

OTHER PUBLICATIONS

Z8 Family of Microcomputers Z8601, Z8602, Z8603, Product Specification, Jun. 1982, pp. 431-441.
Intel Microcontroller Handbook, 1983, Chapter 6, MCS-51 Architecture, pp. 6-24-6-25.

Primary Examiner—Thomas C. Lee
Attorney, Agent, or Firm—Jonathan P. Meyer

[57] ABSTRACT

An interrupt priority circuit is used with a data processor which is responsive to interrupt signals from each of a plurality of resources of predetermined priority. A priority encoder receives all of the interrupt signals, and provides an interrupt vector corresponding to the interrupt signal received from the resource having the highest predetermined priority. However, the interrupt priority of a selected resource may be dynamically altered to the highest priority by storing a corresponding priority vector into a priority register. A first multiplexor controlled by the priority vector provides an enable signal whenever an interrupt signal is received from the selected resource. A second multiplexor controlled by the enable signal provides the priority vector if the enable signal is present or the interrupt vector otherwise. A gate controlled by the data processor may be provided to selectively couple the vector provided by the second multiplexor onto the address bus.

7 Claims, No Drawings

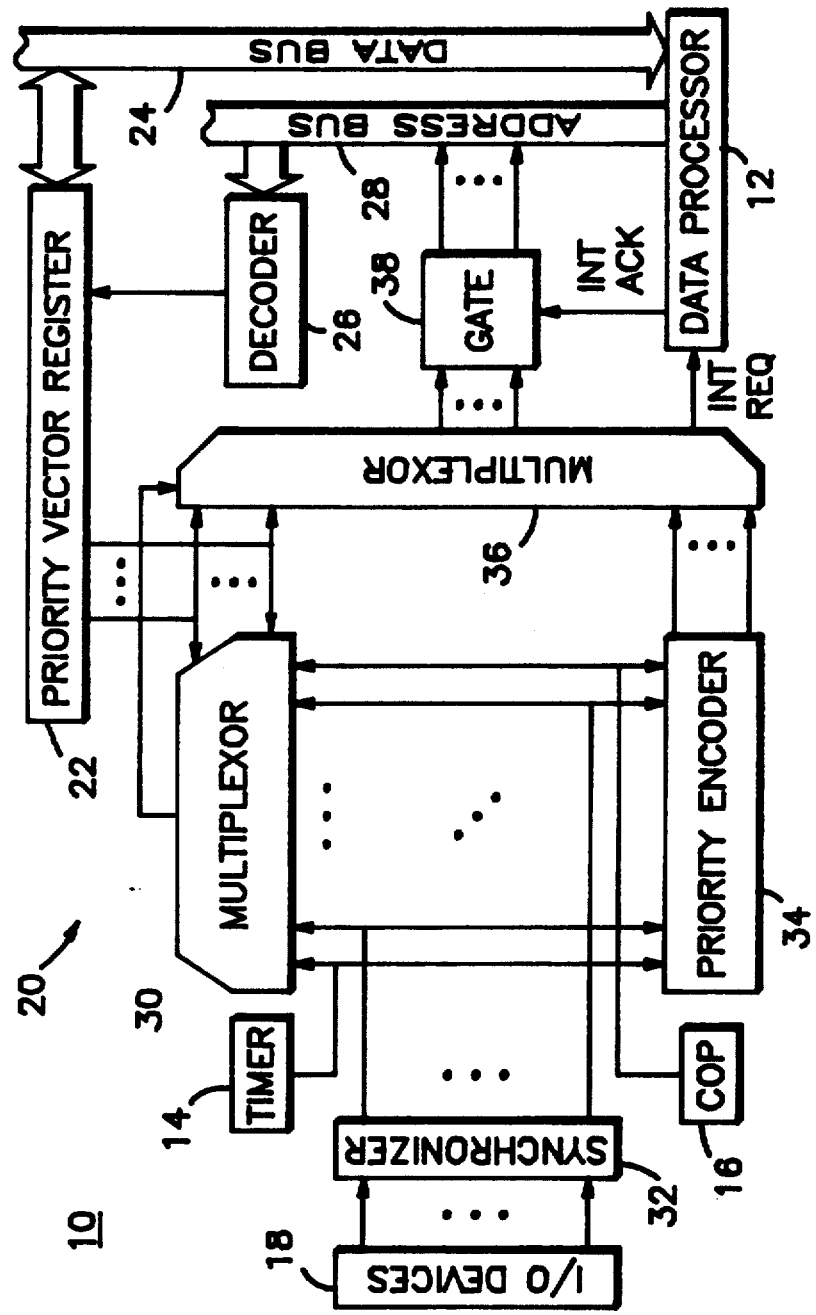

DYNAMICALLY ALTERABLE INTERRUPT PRIORITY CIRCUIT

TECHNICAL FIELD

The present invention relates generally to interrupt priority circuits for use in data processors, and, more particularly, to a dynamically alterable interrupt priority circuit.

BACKGROUND ART

In early data processing systems, the processor periodically polled each of the various resources, such as tape drives, card readers and printers, in order to ascertain whether the resource required servicing by the processor. In these systems, the relative priority of the resources depended upon the ordering of the resources in the software polling loop executed by the processor. However, significant processing time was wasted in polling resources which were inactive or otherwise not in need of servicing.

With advances in the design of the processor to allow the instruction processing sequence to be interrupted, resources were allowed to request servicing by the processor when necessary. However, most such systems implemented a single interrupt path, and the processor had to determine which resource generated the interrupt as the first step in the interrupt servicing routine. Later processors provided more than one interrupt path, but even in such processors more resources could be present than there were interrupt paths, and the processor still had to determine which resource was requesting service. Even in those large data processing systems wherein many interrupt levels were provided, the extensive interrupt priority networks necessary to resolve conflicts tended to be quite complex and expensive.

In more recent data processing systems, the flexibility of the interrupt mechanism has been enhanced by allowing the user to dynamically alter the relative priorities of the several interrupt levels. In those systems wherein the user has complete flexibility in defining the priority ordering, the required circuitry expands more than exponentially for each additional level of priority. Typical of such systems are those shown in U.S. Pat. Nos. 3,925,766/4,001,784 and 4,035,780. In most systems, however, significant circuitry is saved by offering the user less than full alterability. This latter solution has become typical in single-chip microcomputer systems.

For example, in the Intel 8051 microcomputer, each of five interrupt sources may have either a high of a low priority level depending upon the state of a corresponding user-accessible control bit. Within each level, the relative priority of the several sources is fixed. Although a high-priority level interrupt will interrupt the servicing of a low-priority level interrupt, neither level interrupt will interrupt the servicing of the same or higher level interrupt. Thus, using this compromise, the user can dynamically shift levels but not priority within level. In order to be sure that a particular interrupt will have the highest priority, the user must reduce all of the interrupts to the lowest level.

In contrast, in the Zilog Z8 microcomputer, the six available interrupt levels are arbitrarily grouped into three groups of two each. A respective one of three user-accessible control bits defines the relative priority of the two levels within each group. An additional three user-accessible control bits defines the relative priority between the three groups. Thus, using this rather complicated mechanism, the user can dynamically redefine the six priority levels in 48 of the 720 possible orderings. However, by changing the group priorities, the user necessarily redefines the relative priority of both of the interrupt levels within each group and cannot generally redefine the priority of only one of the interrupt levels.

Each of the known fully alterable interrupt priority mechanisms is less than satisfactory in terms of circuit complexity if the user only needs the ability to selectively define the particular one of the several interrupt sources as having the highest priority. Similarly, the known compromise schemes preclude the user from dynamically selecting the highest priority interrupt source while preserving the ability of each of the priority levels to interrupt the servicing of even lower priority levels.

SUMMARY OF THE INVENTION

Accordingly, it is an object of the present invention to provide an interrupt priority circuit which enables the user to select the interrupt signal from a particular one of a plurality of resources which is to have the highest priority.

Another object of the present invention is to provide an interrupt priority circuit which allows the user to dynamically change the interrupt signal from a particular one of a plurality of resources so as to have the highest priority.

Yet another object of the present invention is to provide an interrupt priority circuit which quickly and efficiently selects the interrupt signal from a particular resource defined by a user as having the highest priority.

These and other objects of the present invention are achieved in a data processing system having a data processor which is responsive to interrupt signals from each of a plurality of resources of predetermined priority. In the preferred form, the data processing system includes an interrupt priority circuit comprising: a priority encoder which receives the interrupt signals from all of the resources, and provides an interrupt vector corresponding to the interrupt signal received from the resource having the highest priority; a register which selectively stores a priority vector corresponding to the interrupt signal of a user selected one of the resources; a first multiplexor, controlled by the priority vector, which receives the interrupt signals from all of the resources and then provides an enable signal in response to receiving the interrupt signal from the selected one of the resources; and a second multiplexor, controlled by the enable signal, which receives the priority vector and the interrupt vector, provides the priority vector to the data processor in response to the enable signal, but provides the interrupt vector to the data processor otherwise.

BRIEF DESCRIPTION OF THE DRAWING

The sole figure illustrates an interrupt priority circuit in accordance with the present invention in combination with a data processor.

DETAILED DESCRIPTION OF THE INVENTION

Shown in the figure is a data processing system 10 comprising a data processor 12 which is responsive to interrupt signals from a plurality of resources which may include an internal timer 14, an internal serial I/O (SIO) controller 16, and any of several external I/O devices 18 such as terminals, disks, printers and the like. The data processing system 10 also includes an interrupt priority circuit 20 which intercepts the interrupt signals provided by all of the resources and provides to the processor 12 a vector corresponding to the interrupt signal provided by the resource having the highest priority. In the preferred embodiment, the interrupt priority circuit 20 allows the user to selectively override the preestablished priority scheme and dynamically define any one of the resources as having the highest priority.

In the illustrated form of the interrupt priority circuit 20, a priority vector selected by the user to correspond to the interrupt signal of a particular one of the several resources is stored by the processor 12 under control of the user program into a priority vector register 22 via a data bus 24 when a decoder 26 detects a preassigned address provided by the processor 12 on an address bus 28. A conventional multi-channel multiplexor 30, controlled by the priority vector in register 22, receives interrupt signals from all of the resources, either directly or via synchronizer 32, and provides an enable signal in response to receiving an interrupt signal from the particular resource indicated in register 22. Simultaneously, a conventional multi-bit priority encoder 34 receives the interrupt signals from all of the resources, and provides an interrupt vector corresponding to the interrupt signal received from the resource having the highest preassigned priority.

A conventional multi-bit, 2-channel multiplexor 36, controlled by the enable signal from multiplexor 30, receives both the priority vector and the interrupt vector, and provides the priority vector in response to the enable signal and the interrupt vector otherwise. Preferably, the multiplexor 36 simultaneously provides an interrupt request (INT REQ) signal to advise the processor 12 that an interrupt signal has been received. When the processor 12 provides an interrupt acknowledge (INT ACK) signal indicating that the interrupt is to be serviced, a gate 38 will transfer the vector provided by the multiplexor 36 onto the address bus 28. Once on the address bus 36, the vector will operate in a conventional manner to direct the processor 12 to the interrupt service routine appropriate for the particular resource.

Since the interrupt signals are typically asynchronous with respect to the operation of the processor 12, a race condition may arise whenever the processor 12 stores a new priority vector into the register 22. For example, assume that interrupt signals are received from the resources corresponding to both the old and new priority vectors, just as the processor 12 begins execution of the instruction which stores the new priority vector into register 22. In normal fashion, the interrupt priority logic 20 will proceed to provide the old priority vector to gate 38 and to provide the INT REQ signal to the processor 12. However, the processor 12 will not act upon the INT REQ until after the completion of the current instruction, that is, until after the new priority vector has been stored into the register 22. By this time, however, the new priority vector will already have begun to propagate through the circuit 20 toward gate 38. Depending upon the relative speeds of the processor 12 and the circuit 20, either the old or new priority vectors may be gated onto the address bus 28. Worse yet, gate 38 may allow first the old priority vector and then the new priority to be output onto the address bus 28 during the same bus cycle.

To prevent this race situation, some form of interlock mechanism may be added to circuit 20. For example, the instruction responsible for storing the new priority vector into register 22 may be lengthened so that the new priority vector will have time to fully propagate through the circuit 20 before the end of the instruction. Alternatively, a latch may be provided between the multiplexor 36 and gate 38 to latch the "current" vector, either old or new, in response to either the INT REQ or the INT ACK signals. Preferably, however, the processor 12 may include an internal control bit which when set will mask the INT REQ signal. The processor 12 may then execute an instruction which sets this mask bit before executing the instruction which stores the new priority vector into the register 22. Thereafter, processor 12 may execute an instruction which resets this mask bit. In this manner, the processor 12 will recognize no interrupts until well after the circuit 20 has had time to respond fully to the new priority vector.

In some data processing systems, certain types of interrupt signals, such as a reset signal or a fault signal from an internal activity monitor, are so important that the user should be precluded from assigning any other interrupt signal of lesser importance a higher priority. In such a system, a separate interrupt priority circuit of more conventional form may be included to implement a fixed priority scheme among these "superior" interrupt signals. If so, circuit 20 should be modified, by adding either an additional multiplexor or an additional channel to multiplexor 36, so that the vector provided by the fixed priority circuit will be provided to gate 38 in response to one of the superior interrupt signals.

While the invention has been described in the context of a preferred embodiment, it will be apparent to those skilled in the art that the present invention may be modified in numerous ways and may assume many embodiments other than that specifically set out and described above. For example, since circuit 20 is so efficient in terms of circuitry, several such circuits may be provided with descending relative priority so that the user may dynamically alter the relative priorities of several resources. Accordingly, it is intended by the appended claims to cover all modifications of the invention which fall within the true spirit and scope of the invention.

I claim:

1. In an interrupt priority circuit comprising first means for receiving a plurality of interrupt signals, second means coupled to said first means for selecting one of said interrupt signals according to a predetermined priority scheme and third means coupled to said second means for producing an output signal indicating said selected one of said interrupt signals, the improvement comprising:

fourth means for receiving and storing an input signal which designates a highest priority one of said plurality of interrupt signals;

first register means for storing said input signal;

fifth means coupled to said first register means and responsive to said plurality of interrupt signals for providing an enable signal to said third means if said highest priority interrupt signal signal is received; and wherein said third means is coupled to said fifth means to provide that said output of said third means indicates said highest priority interrupt signal if said means provides said enable signal and indicates said one of said interrupt signals selected by said second means otherwise.

2. A method of selecting one of a plurality of interrupt signals comprising the steps of:

applying a predetermined priority scheme to select one of said plurality of interrupts;

receiving an input indicating a highest priority one of said plurality of interrupts;

determining whether said highest priority interrupt is active; and overriding said predetermined priority scheme to select said highest priority interrupt only if said highest priority interrupt is determined to be active.

3. A microcomputer comprising:

a processor capable of servicing a plurality of interrupt sources;

an interrupt priority encoder having inputs coupled to receive interrupt request signals from each of said plurality of interrupt sources and an output;

a register having an input coupled to receive a data value from the processor and an output; and first logic means having inputs coupled to receive the interrupt request signals from each of said plurality of interrupt sources and the output of the register for generating an output signal if an interrupt source identified by the data value in the register is currently generating an interrupt request signal; and second logic means having inputs coupled to the output of the first logic means, the output of the interrupt priority encoder and the output of the register and having an output coupled to the processor for providing to the processor a data value corresponding to the data value in the register if the first logic means is generating the output signal and for providing to the processor a data value corresponding to the output of the interrupt priority encoder otherwise.

4. A microcomputer according to claim 3 wherein said second logic means is a multiplexor.

5. A microcomputer according to claim 4 wherein the data value stored in the register represents an interrupt vector.

6. A microcomputer according to claim 5 wherein the output of the priority encoder represents an interrupt vector.

7. A microcomputer according to claim 6 wherein the output of the second logic means is coupled to an address bus of the processor.

* * * * *

UNITED STATES PATENT AND TRADEMARK OFFICE
CERTIFICATE OF CORRECTION

PATENT NO. : 5,083,261

DATED : January 21, 1992

INVENTOR(S) : Brian F. Wilkie

It is certified that error appears in the above-identified patent and that said Letters Patent is hereby corrected as shown below:

Column 4:
In Claim 1, line 65, after "interrupt" delete -- signal --.

Signed and Sealed this

Second Day of November, 1993

Attest:

Attesting Officer

BRUCE LEHMAN

Commissioner of Patents and Trademarks